UNITED STATES PATENT OFFICE.

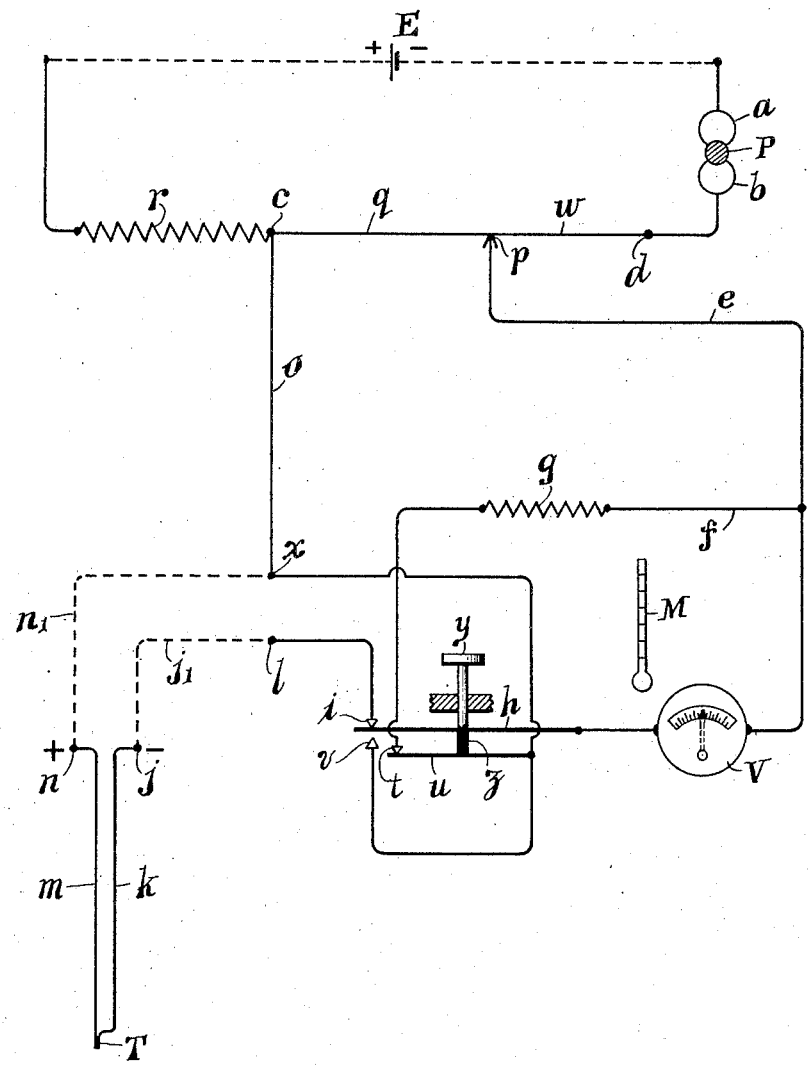

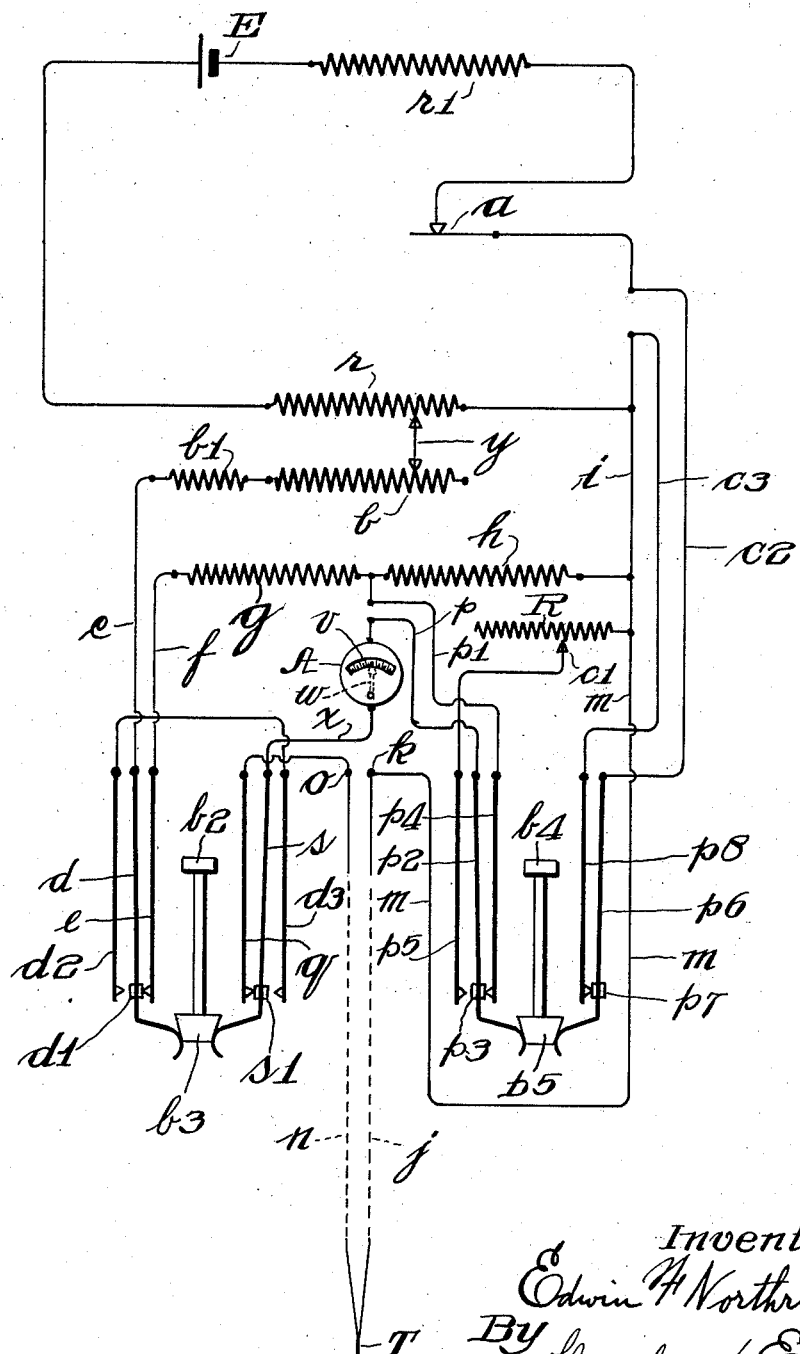

EDWIN F. NORTHRUP, OF PRINCETON, NEW JERSEY, ASSIGNOR TO PYROLECTRIC INSTRUMENT CO., OF TRENTON, NEW JERSEY, A CORPORATION OF NEW JERSEY.

METHOD OF ELECTRICAL MEASUREMENT.

1,374,316. Specification of Letters Patent. Patented Apr. 12, 1921.

Application filed February 15, 1919. Serial No. 277,132.

*To all whom it may concern:*

Be it known that I, EDWIN F. NORTHRUP, a citizen of the United States, residing at Princeton, county of Mercer, State of New Jersey, have invented a new and useful Method of Electrical Measurement, of which the following is a specification.

My invention relates to methods of electrical measurement, and more particularly to methods of electrically measuring temperatures.

My invention resides in a method of measuring the electro-motive-force of a thermo-couple or other source, which consists in producing a fall or difference of potential, by current passed through a resistance, equal to the unknown electro-motive-force as indicated by zero deflection of a galvanometer connected in series with the thermo-couple or other source in parallel to said resistance, and thereafter disconnecting the galvanometer from the thermo-couple or other source and employing it either to measure the fall of potential across said resistance or to measure the current through said resistance, and thereby produce a deflection indicating the electro-motive-force of the thermo-couple or other source.

For an illustration of one of various modes of practising my invention, reference may be had to the accompanying drawings, in which:

Figure 1 is a diagrammatic view of apparatus by which my method may be practiced.

Fig. 2 is a diagrammatic view of a modified form of apparatus for practising a modification of my method, and for making possible a further step of employing a thermo-couple and galvanometer with circuit of predetermined resistance for measuring temperature.

The apparatus illustrated in Fig. 1 is of the character disclosed in my prior Letters Patent No. 1,245,609, November 6, 1917; and the apparatus illustrated in Fig. 2 is of the character disclosed in my prior Letters Patent No. 1,245,956, November 6, 1917, with which is associated further structure of the character disclosed in my copending application Serial Number 244,919, filed July 15, 1918.

Referring to Fig. 1, E is a battery, dry cell or other source of direct current which need not, however, be a standard cell or source of unvarying or constant electro-motive-force. Upon insertion of the plug P between the plug contacts $a$ and $b$ a circuit will be closed through the resistance $r$ and the potentiometer slide wire $w$ extending from the point $c$ to the point $d$. Movable in contact with the slide wire $w$ is the slider contact $p$ connected through conductor $e$ to one terminal of a millivoltmeter V. This instrument may be of the type involving a coil movable in a permanent magnet field and may be, for example, a Weston direct current millivoltmeter. Or V may be any type of direct current reading instrument adapted to give a deflection with a small current. The conductor $e$ connects also through conductor $f$ with one terminal of the resistance $g$ which is made exactly equal to the resistance of the millivoltmeter or other instrument V. The remaining terminal of the millivoltmeter V connects to the contact spring $h$ which is normally in electrical contact with the stationary contact $i$ connected to the terminal $l$. The thermo-element or thermo-electric couple comprising the conductors $k$ and $m$ of dissimilar metals, forming a thermo-junction T which is subjected to the temperature to be measured, may have terminals $j$ and $n$ connected to the terminals $l$ and $x$ by the leads $j^1$ and $n^1$ shown in dotted lines.

The lead $n^1$ may be of any length and should preferably consist of wire of the same material as the thermo-couple wire $m$. Likewise the lead $j^1$ should be of the same material as the wire $k$ of the thermo-element. Then if at $x$ and $l$ the leads become copper for the other circuits, the cold junction of the thermo-couple is located at the points $x$ and $l$ near together and at the measuring apparatus.

The remaining terminal of the resistance $g$ connects to stationary contact $t$ normally engaged by the contact spring $u$ which is connected to the stationary contact $v$ and to the terminal $x$ which connects by wire $o$ to the slide wire at $c$. A button or key $y$ is adapted to thrust downwardly upon the contact spring $h$ to deflect the same and in so doing transmit a pressure through the insulating member $z$ to the contact spring $u$ to simultaneously deflect it.

The mode of operation is as follows:

With the contact springs $h$ and $u$ in their normal positions indicated in the drawing, the resistance $g$ is connected in shunt with that part of the slide wire $w$ between the point $c$ and the rider contact $p$, and the thermo-junction T and the millivoltmeter V are connected in series with each other and in shunt to the resistance $g$ and the said portion of the slide wire $w$.

The rider contact $p$ is then moved along the slide wire resistance $w$ to such position that the millivoltmeter V indicates that position which corresponds to that position which the pointer takes when no current flows through the millivoltmeter V. When this condition obtains it indicates that the thermo-element $m$, $k$, is generating such electro-motive-force, due to the difference in temperature between its hot junction T and its cold junction at $j$, $n$, or at $x$, $l$ when leads of the same material as the thermo-element are continued to $x$, $l$, that it exactly balances the fall of potential due to the current delivered by the battery E through the resistances $q$ and $g$ in parallel with each other, $q$ being the resistance of that part of the slide wire $w$ between the point $c$ and the movable contact $p$, and $g$ being as stated equal to the resistance of the millivoltmeter V. After this balance has been obtained, the button or key $y$ is depressed, with the result that the contact spring $h$ separates from contact $i$ and engages contact $v$, and contact spring $u$ separates from contact $t$. The result is that the resistance $g$ is taken out of circuit, as is also the thermo-element $m$, $k$, and the millivoltmeter V is now brought into shunt with the resistance $q$. Since the millivoltmeter V has a resistance equal to the resistance $g$, the current through the resistance $q$ is the same as it was before the key or button $y$ was depressed, because for the resistance $g$ has been substituted an equal resistance, that of the millivoltmeter V. And accordingly the millivoltmeter gives a deflection whose reading is equal to the fall of potential across the resistance $q$, which is the same fall of potential which was balanced by the electro-motive-force produced by the thermo-element $m$, $k$. In other words, the millivoltmeter now gives a reading, which, if the instrument is calibrated in electro-motive-force, is equal to the electro-motive-force produced by the thermo-element $m$, $k$. Or if the instrument V is calibrated in temperatures, as it may be by well known methods with respect to the particular thermo-element $m$, $k$ employed, the instrument V will read directly the difference in temperature between the cold and hot junctions of the thermo-element.

When the instrument V is calibrated in degrees of temperature, the position taken by its pointer when a balance is obtained as above described, that is, when no current is flowing through the instrument, will be marked 20 degrees centigrade, which is the average temperature of the cold junction or average room temperature. A small mercury thermometer M located in the base of the instrument V will be consulted to indicate the temperature in degrees centigrade above or below 20 degrees centigrade. This reading of the mercury thermometer can then be added to or subtracted from the temperature indicated by the instrument V. The correction for a temperature of the cold junction, located at the instrument V or in its base, is in this way taken care of.

From the foregoing it will therefore be seen that the length or diameter of the thermo-element conductors $m$, $k$ may be anything desired, because their resistance in no way affects the results. Therefore these conductors $m$ and $k$ may be very fine or small, especially when of noble metals, and may extend from the hot junction T, however remote, to the reading instrument, that is, to the points $x$, $l$, whereby the cold junction may be maintained near or at the reading instrument V. And it also is readily seen that the resistance of the voltmeter V as such in the circuit of the thermo-element is a matter of indifference, because an adjustment is made of the contact $p$ which will cause the millivoltmeter V to give zero indication, that is, to produce a condition such that no current flows through the voltmeter V, and under such circumstances its resistance is a matter of indifference.

As intimated above, the battery E need not be a standard cell, because its voltage or electro-motive-force will not vary during the time of an observation which requires but a few seconds. And if it should vary from day to day it is immaterial, because whatever its electro-motive-force, the contact $p$ is moved to such point that the fall of potential across the resistances $q$ and $g$ joined in parallel is equal to the electro-motive-force produced by the thermo-element.

In practice the spring contacts $i$, $v$, $t$, the button $y$, the resistances $r$, $g$ and $q$ and the plug P would all be permanently located in the base of the instrument V and constitute a single, portable and robust unit. The thermo-couple $m$, $k$ and the dry cell E would be attached to this unit by the leads shown in dotted lines.

Referring to Fig. 2, E is any suitable source of direct current, such as a battery or dry cell, which need not be a standard cell or source of unvarying or constant electro-motive-force. When the switch $a$ is closed, current from the battery E passes through the resistances $r$ and $r^1$. In a circuit or branch in parallel or shunt with a variable portion of the resistance in circuit with the battery E, as a variable portion of the resistance $r$, are the serially connected resistances $b$, $b^1$, $g$ and $h$, one terminal of the resistance $h$ being connected by conductor $i$ with one terminal of the resistance $r$. The amount of resistance $b$ in the shunt or parallel branch or circuit is variable simultaneously with variation of the resistance $r$ by the double contact device $y$ which simultaneously passes over both resistances $r$ and $b$. One terminal of the resistance $b^1$ connects by conductor $c$ with the contact spring $d$ carrying the contact $d^1$ normally in engagement with the contact spring $e$ connected by conductor $f$ to one terminal of the resistance $g$. A second contact spring $d^2$, adapted to be engaged by the contact $d^1$, is connected with a similar contact spring $d^3$ adapted to be engaged by the contact $s^1$ on the contact spring $s$ connected by conductor $x$ with one terminal of the galvanometer A. The contact $s^1$ is normally in engagement with the contact spring $q$ connected with one of the binding posts $o$ to which is connected the lead $n$ from the thermo-junction T or other source of electro-motive-force, whose other terminal connects through lead $j$ with the binding post $k$, which connects by conductor $m$ with one terminal of the adjustable resistance or rheostat R and with one terminal of each of the resistances $r$ and $h$.

The galvanometer A, such as a milliammeter, is preferably of the well known D'Arsonval type of direct current measuring instrument comprising a coil movable in a permanent magnet field. It has a scale or scales $v$ with which coöperates the needle or pointer $w$ actuated by the moving coil of the instrument. The scale $v$ may read in any desirable or suitable units and though, in the particular example illustrated, the instrument is used as a current measuring instrument, as a milliammeter, the scale may read in units of voltage, as millivolts, or in units of temperature, or both. The remaining terminal of the galvanometer A connects to a point between the resistances $g$ and $h$ through the conductors $p$ and $p^1$ connected, respectively, to the contact springs $p^2$ and $p^4$, $p^2$ carrying a contact $p^3$ normally in engagement with the spring contact $p^4$. The contact $p^3$ is adapted to engage also the contact spring $p^5$ connected to the movable contact or rider $c^1$ of the adjustable resistance or rheostat R.

In circuit with the battery E and the resistances $r$ and $r^1$ is the normally closed switch comprising the contact spring $p^6$ carrying the contact $p^7$ normally in engagement with the contact spring $p^8$, the springs $p^6$ and $p^8$ being connected, respectively, by conductors $c^2$ and $c^3$ to the switch $a$ and resistance $r$.

By pushing downwardly upon the button $b^2$ the conical or tapering member $b^3$ thrusts the lower ends of the contact springs $d$ and $s$ apart, causing the contacts $d^1$ and $s^1$ to leave the contact springs $e$ and $q$ and to engage the contact springs $d^2$ and $d^3$. Similarly, pushing downwardly upon the button $b^4$ causes the member $b^5$ to push the contact springs $p^2$ and $p^6$ apart, causing contact $p^3$ to separate from contact spring $p^4$ and to engage contact spring $p^5$, and to cause contact $p^7$ to separate from contact spring $p^8$.

The operation is as follows:

With the contacts $d^1$, $s^1$, $p^3$ and $p^7$ in their normal positions indicated in the drawing, the contact $y$ is moved to such position upon the resistances $r$ and $b$ that the galvanometer A does not deflect or indicates zero current therethrough. This means that the source of current of unknown electro-motive-force, as thermo-couple T, which is in series in this position of the switching mechanism with the galvanometer A and in a path in shunt to the resistance $h$, has opposed to it an equal and opposite electro-motive-force which is the fall of potential across the resistance $h$ caused by current from the battery E. The button $b^2$ is now depressed, separating contact $d^1$ from contact spring $e$ and bringing it into engagement with contact spring $d^2$, and simultaneously separating contact $s^1$ from contact spring $q$ and bringing it into engagement with the contact spring $d^3$. This switching operation cuts out of circuit the thermo-couple T and the resistance $g$, and brings the galvanometer A into series relation with the resistance $h$ in place of the resistance $g$, whose magnitude is equal to that of the resistance of the galvanometer A including its moving coil or any associated resistance. The galvanometer A will now be traversed by a current of the same magnitude that was previously flowing through resistances $g$ and $h$, and the resultant deflection indicates either the temperature of the thermo-couple T, or its electro-motive-force, or both if the instrument is provided with both a potential and a temperature scale.

The deflection or reading of the galvanometer A having thus been taken for the then temperature of the thermo-couple T, the pressure upon the button $b^2$ is released, and the member $b^3$ is returned to normal position indicated. The button $b^4$ is then depressed causing contact $p^3$ to engage the contact spring $p^5$ and contact $p^7$ to separate from contact spring $p^8$, the latter operation opening the circuit of the battery E. We then have the galvanometer A connected in a closed circuit through the switch $s$, $q$ in series with the thermo-couple T, conductor $m$, adjustable resistance or rheostat R, and through the now closed switch $p^2$, $p^5$. When this circuit arrangement has been established, the rider $c^1$ is adjusted along the resistance R to that position which will bring the needle or pointer $w$ of the galvanometer A back to the same position of deflection occurring upon depression of the button $b^2$ as above described. This means that there is now flowing through the galvanometer A a current of the same magnitude as before, and, the temperature of the thermo-couple being the same as before, because the switching operations are so quickly accomplished, the resistance of the thermo-couple circuit through its leads, galvanometer A and resistance R, is now the proper resistance to insure that the thermo-couple T, even when at new or different temperatures, will as a source of current cause passage of the correct amount of current through the galvonometer A to cause a deflection which will directly indicate either the electro-motive-force of the thermo-couple or its temperature, the temperature scale of the instrument A of course having been predetermined for the particular thermo-couple used.

In this way the readings of temperature or electro-motive-force may be taken with the thermo-couple connected simply in series with the galvanometer A, and the amount of resistance in the circuit may be checked from time to time by reverting to the adjustment of the contact $y$ and operation of the switching mechanism by the button $b^2$. If the resistance of the thermo-couple circuit when in series with the galvanometer A and resistance R does not vary, checking is not necessary; but inasmuch as lead-resistances or other resistance in the circuit may from time to time vary, the above described checking becomes necessary, and the instrument is checked whenever it is believed that a change in the resistance of the thermo-couple circuit may have occurred.

The switch $a$ will ordinarily be opened when the apparatus is out of use.

While in accordance with the patent statutes I have herein described the preferred modes of practising my invention, it will be understood that my invention is not limited thereto and its scope is to be determined by the appended claims.

What I claim is:

1. The method of determining the value of an unknown electro-motive-force, which consists in passing current through a resistance path, connecting the source of electro-motive-force of unknown value in series with a galvanometer in a shunt on said resistance path to produce a balance between the electro-motive-force of said source and the fall of potential through the part of said resistance path bridged by said shunt, thereafter disconnecting said source of electro-motive-force from said galvanometer, and associating said galvanometer with said resistance path to cause a deflection indicative of the value of the electro-motive-force of said source.

2. The method of measuring temperature which consists in subjecting a junction of a thermo-couple to the temperature to be measured, passing current through a resistance path, connecting the thermo-couple and a galvanometer in series with each other in a shunt on said resistance path to produce a balance between the electro-motive-force of said thermo-couple and the fall of potential through the part of said resistance path bridged by said shunt, and thereafter disconnecting said thermo-couple from said galvanometer and substituting said galvanometer for a resistance of equal value in association with said resistance path to produce a galvanometer deflection indicative of the temperature of said junction of said thermo-couple.

3. The method of determining the value of an unknown electro-motive-force, which consists in passing current through serially connected resistances, connecting the source of electro-motive-force of unknown value and a galvanometer in series with each other in shunt to one of said resistances, varying the current through said resistances to produce a fall of potential in said one of said resistances equal to the electro-motive-force of said source, disconnecting said source from said galvanometer and substituting said galvanometer for another of said resistances of value equal to the resistance of said galvanometer in series with said one of said resistances to measure the current flowing through said one of said resistances to indicate the value of the electro-motive-force of said source.

4. The method of measuring temperature, which consists in subjecting a junction of a thermo-couple to the temperature to be measured, passing current through serially connected resistances, connecting the thermo-couple in series with a galvanometer in shunt to one of said resistances, varying the current through said resistances until the fall of potential in said one of said resistances is equal to the electro-motive-force of said thermo-couple, thereafter disconnecting said thermo-couple from said galvanometer and substituting said galvanometer for another of said resistances having a value equal to the resistance of said galvanometer to measure the current through said resistances to indicate the electro-motive-force of said thermo-couple or the temperature of its said junction.

In testimony whereof I have hereunto affixed my signature the 13th day of February, 1919.

EDWIN F. NORTHRUP.